United States Patent
Mallinar et al.

(10) Patent No.: US 11,380,306 B2
(45) Date of Patent: Jul. 5, 2022

(54) ITERATIVE INTENT BUILDING UTILIZING DYNAMIC SCHEDULING OF BATCH UTTERANCE EXPANSION METHODS

(71) Applicant: INTERNATIONAL BUSINESS MACHINES CORPORATION, Armonk, NY (US)

(72) Inventors: Neil Rohit Mallinar, Long Island City, NY (US); Rajendra G Ugrani, Union City, NJ (US); Ayush Gupta, Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 397 days.

(21) Appl. No.: 16/670,777

(22) Filed: Oct. 31, 2019

(65) Prior Publication Data

US 2021/0134273 A1 May 6, 2021

(51) Int. Cl.
*G06F 16/34* (2019.01)
*G06F 40/295* (2020.01)
(Continued)

(52) U.S. Cl.
CPC ........ *G10L 15/14* (2013.01); *G06F 16/90332* (2019.01); *G06K 9/6259* (2013.01); *G06N 20/00* (2019.01)

(58) Field of Classification Search
CPC ........ G06F 40/30; G06F 40/35; G06F 40/205; G06F 40/284; G06F 16/285;
(Continued)

(56) References Cited

U.S. PATENT DOCUMENTS

| 7,742,918 B1 * | 6/2010 | Hakkani-Tur | ........ G10L 15/063 704/251 |
| 8,010,357 B2 * | 8/2011 | Hakkani-Tur | ...... G10L 15/1822 704/244 |

(Continued)

FOREIGN PATENT DOCUMENTS

WO 2017156640 A1 9/2017

OTHER PUBLICATIONS

Williams et al, "Rapidly scaling dialog systems with interactive learning:, 2015, In Natural language dialog systems and intelligent assistants", 2015 (pp. 1-13). Springer, Cham.*
(Continued)

*Primary Examiner* — Olujimi A Adesanya
(74) *Attorney, Agent, or Firm* — Griffiths & Seaton PLLC (57) ABSTRACT

Expansion of intent classification data utilizing batch utterance scheduling, by a processor in a computing environment. A set of unlabeled examples for intent processing is received by an intent builder iteratively defining an intent. The set of examples are separated into a first subset processed according to a first model and a second subset processed according to a second model. The first subset is incorporated into the intent builder during a building iteration and scheduling a first batch processing of the second subset processed according to the second model based on a scheduling criteria. The first batch processing of the second subset is initiated once the scheduling criteria is satisfied. Upon completion of the first batch processing, results of the completion are used to influence additional examples retrieved from the first subset and the second subset during a subsequent building iteration by the intent builder.

18 Claims, 6 Drawing Sheets

(51) Int. Cl.
  *G06F 40/284* (2020.01)
  *G10L 15/14* (2006.01)
  *G06N 20/00* (2019.01)
  *G06F 16/9032* (2019.01)
  *G06K 9/62* (2022.01)

(58) Field of Classification Search
  CPC .............. G06F 16/3344; G06F 40/253; G10L 15/1822; G10L 15/22; G10L 15/26
  See application file for complete search history.

(56) References Cited

U.S. PATENT DOCUMENTS

| | | | |
|---|---|---|---|
| 8,069,042 | B2 | 10/2011 | Joublin et al. |
| 8,515,736 | B1 | 8/2013 | Duta |
| 8,554,715 | B2 | 10/2013 | Kraaij et al. |
| 8,571,869 | B2 | 10/2013 | Deligne et al. |
| 9,196,245 | B2 | 11/2015 | Larcheveque et al. |
| 9,292,262 | B2 | 3/2016 | Gabel et al. |
| 9,436,759 | B2 | 9/2016 | Huang et al. |
| 9,589,564 | B2 | 3/2017 | Sharifi |
| 9,842,000 | B2 | 12/2017 | Bishop et al. |
| 10,102,846 | B2 | 10/2018 | Braz et al. |
| 10,395,648 | B1 | 8/2019 | Benkreira et al. |
| 10,515,630 | B1 | 12/2019 | Benkreira et al. |
| 10,657,166 | B2 | 5/2020 | Gorzela et al. |
| 10,726,827 | B2 | 7/2020 | Braz et al. |
| 10,789,943 | B1 | 9/2020 | Lapshina et al. |
| 2003/0200172 | A1 | 10/2003 | Randle et al. |
| 2005/0131850 | A1* | 6/2005 | Cao .......................... G06N 7/02 706/52 |
| 2009/0063145 | A1* | 3/2009 | Hakkani-Tur ...... G10L 15/1822 704/243 |
| 2010/0306249 | A1 | 12/2010 | Hill et al. |
| 2012/0095943 | A1* | 4/2012 | Yankov .................. G06N 20/00 706/12 |
| 2015/0019211 | A1* | 1/2015 | Simard ................. H04L 1/0079 704/10 |
| 2015/0221305 | A1 | 8/2015 | Sharifi |
| 2015/0279360 | A1 | 10/2015 | Mengibar et al. |
| 2016/0055240 | A1 | 2/2016 | Tur et al. |
| 2016/0196820 | A1* | 7/2016 | Williams ................. G06F 3/167 704/244 |
| 2017/0242886 | A1 | 2/2017 | Jolley et al. |
| 2017/0235740 | A1 | 8/2017 | Seth et al. |
| 2017/0278514 | A1 | 9/2017 | Mathias et al. |
| 2017/0330077 | A1 | 11/2017 | Williams et al. |
| 2018/0053119 | A1* | 2/2018 | Zeng .................... G06F 40/295 |
| 2018/0068019 | A1 | 3/2018 | Novikoff et al. |
| 2018/0096058 | A1 | 4/2018 | Anderson et al. |
| 2018/0137401 | A1 | 5/2018 | Kumar et al. |
| 2018/0341632 | A1* | 11/2018 | Akkiraju ............. H04M 3/5166 |
| 2018/0358001 | A1* | 12/2018 | Amid .................. G06F 16/3329 |
| 2019/0012371 | A1* | 1/2019 | Campbell .............. G06F 40/35 |
| 2019/0051290 | A1 | 2/2019 | Li et al. |
| 2019/0103095 | A1* | 4/2019 | Singaraju ................ H04L 51/04 |
| 2019/0166069 | A1 | 5/2019 | Yao et al. |
| 2019/0166403 | A1 | 5/2019 | Yelton et al. |
| 2019/0179903 | A1* | 6/2019 | Terry .................... G06N 3/004 |
| 2019/0180195 | A1* | 6/2019 | Terry .................... G06F 40/295 |
| 2019/0180196 | A1* | 6/2019 | Terry .................... G06F 16/34 |
| 2019/0286712 | A1 | 9/2019 | Terry et al. |
| 2019/0318261 | A1* | 10/2019 | Deng .................... G06N 20/00 |
| 2020/0007380 | A1 | 1/2020 | Chen et al. |
| 2020/0034797 | A1* | 1/2020 | Jonnalagadda ......... G06F 40/56 |
| 2020/0065384 | A1 | 2/2020 | Costello |
| 2020/0066255 | A1 | 2/2020 | Madan et al. |
| 2020/0074984 | A1 | 3/2020 | Ho et al. |
| 2020/0090638 | A1* | 3/2020 | Ugrani .................. G06F 16/338 |
| 2020/0097496 | A1* | 3/2020 | Alexander .......... G06F 16/9535 |
| 2020/0151246 | A1* | 5/2020 | Mwarabu .............. G06F 40/284 |
| 2020/0167417 | A1 | 5/2020 | Li et al. |
| 2020/0202256 | A1 | 6/2020 | Chaudhari et al. |
| 2020/0219494 | A1 | 7/2020 | Dhoolia et al. |
| 2020/0236068 | A1 | 7/2020 | Fenyenhuis et al. |
| 2020/0242305 | A1 | 7/2020 | Wu |
| 2020/0250277 | A1 | 8/2020 | Mallette et al. |
| 2020/0251100 | A1 | 8/2020 | Tan et al. |
| 2020/0320978 | A1* | 10/2020 | Chatterjee ............... G06F 40/35 |
| 2020/0335097 | A1 | 10/2020 | Seol et al. |
| 2020/0349919 | A1 | 11/2020 | Wanas et al. |

OTHER PUBLICATIONS

Nashaat et al, "Hybridization of active learning and data programming for labeling large industrial datasets", Dec. 2018, In2018 IEEE International Conference on Big Data (Big Data) Dec. 10, 2018 (pp. 46-55). IEEE.*

Niraula et al., "Judging the quality of automatically generated gap-fill question using active learning", 2015, In Proceedings of the Tenth Workshop on Innovative Use of NLP for Building Educational Applications Jun. 2015 (pp. 196-206).*

Ratner et al, "Snorkel: Rapid training data creation with weaksupervisio", Nov. 2017,. InProceedings of the VLDB Endowment. International Conference on Very Large Data Bases Nov. 2017 (vol. 11, No. 3, p. 269). NIH Public Access.*

Wang et al, "A novel semisupervised active-learning algorithm for hyperspectral image classification.", 2017, IEEE Transactions on Geoscience and Remote Sensing. Mar. 22, 2017;55(6):3071-83.*

Goyal et al, "Fast and scalable expansion of natural language understanding functionality for intelligent agents", Mat 2018, arXiv preprint arXiv:1805.01542. May 3, 2018.*

Mallinar et al, "Bootstrapping conversational agents with weak supervision", Jul. 2019, InProceedings of the AAAI Conference on Artificial Intelligence Jul. 17, 2019 (vol. 33, No. 01, pp. 9528-9533).*

Mallinar et al, "Iterative Data Programming for Expanding Text Classification Corpora", Apr. 2020, InProceedings of the AAAI Conference on Artificial Intelligence Apr. 3, 2020 (vol. 34, No. 08, pp. 13332-13337).*

Williams J.D. et al., Rapidly Scaling Dialog Systems with Interactive Learning. In: Lee G., Kim H., Jeong M., Kim JH. (eds) Natural Language Dialog Systems and Intelligent Assistants. Springer, Cham, 2015.

Rapidly scaling dialog systems with interactive learning Williams, Niraula, Dasigi, et al. Work done while at Microsoft Research (12 Pages).

Anuj Goyal, Angeliki Metallinou, Spyros Matsoukas, Fast and Scalable Expansion of Natural Language Understanding Functionality for Intelligent Agents, Proceedings of NAACL-HLT 2018, pp. 145-152.

Lexander Ratner, Christopher De Sa, Sen Wu, Daniel Selsam, Christopher Re, Date Programming:Creating Large Training Sets, Quickly, NIPS 2016.

"Bootstrapping Conversational Agents With Weak Supervision", Neil Mallinar et al. IBM Watson, New York, NY 10003, USA (6 Pages).

"Complexity Measures of Supervised Classification Problems", Tin Kam Ho, Member, IEEE, and Mitra Basu, Senior Member, IEEE Transactions of Pattern Analysis and Machine Intelligence, vol. 24, No. 3, Mar. 2002 (12 Pages).

List of IBM Patents or Patent Applications Treated as Related (2 Pages).

"Iterative app design for LUIS" https://docs.microsoft.com/en-us/azure/cognitive-services/luis/luis-concept-app-iteration Jul. 6, 2020 (7 Pages).

* cited by examiner

ITERATIVE INTENT BUILDING UTILIZING DYNAMIC SCHEDULING OF BATCH UTTERANCE EXPANSION METHODS

BACKGROUND OF THE INVENTION

Field of the Invention

The present invention relates in general to computing systems, and more particularly, to various embodiments for expansion of intent classification data utilizing batch utterance scheduling for defining intents used in training automated response systems.

Description of the Related Art

Customer contact center systems provide support for customers of a particular product or service by allowing those users to make requests for service that can include a question posed by the user related to the product or service. Generally speaking, these systems receive requests for service in various forms (e.g., in the form of a phone call, web page form, instant message, email, etc.), and route the requests to either a virtual agent or live, human agent for addressing the request and providing an answer to the question. For example, a chat or other interactive session can be conducted between the customer or client and an automated virtual agent which guides the interaction based on a set of scripts and a knowledgebase related to the topic of the contact. In other cases, a chat session can be initiated between the customer and the live agent who can interact directly with the customer over any one or more of the available channels (e.g., web chat, instant message, email exchange, etc.).

In implementations where automated response systems are used (e.g., using a chatbot), it is imperative to train these systems with intent data such that the system provides semantically accurate responses to clients interacting therewith according to the context of the client's query.

SUMMARY OF THE INVENTION

Various embodiments for expansion of intent classification data utilizing batch utterance scheduling in a computing environment are provided. In one embodiment, a method comprises receiving a set of unlabeled examples for intent processing by an intent builder iteratively defining an intent. The set of examples are separated into a first subset processed according to a first model and a second subset processed according to a second model. The first subset is incorporated into the intent builder during a building iteration and scheduling a first batch processing of the second subset processed according to the second model based on a scheduling criteria. The first batch processing of the second subset is initiated once the scheduling criteria is satisfied. Upon completion of the first batch processing, results of the completion are used to influence additional examples retrieved from the first subset and the second subset during a subsequent building iteration by the intent builder.

In addition to the foregoing exemplary embodiment, various other system and computer program product embodiments are provided and supply related advantages. The foregoing Summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

As previously mentioned, in contemporary customer contact centers, the systems therein provide support for customers of a particular product or service by allowing those users to make requests for service that can include a question posed by the user related to the product or service. In some cases, a chat session can be initiated between the customer or client and a live agent (e.g., a human operator) or a virtual agent (e.g., a chatbot operated by a computing system) who can interact directly with the customer over any one or more available channels (e.g., web chat, instant message, email exchange, etc.). In implementations which rely on virtual agents, often times a substantial obstacle to overcome when interacting with human customers or clients is ascertaining by the virtual agent what the underlying intent is of a query or statement posed by human customer or client.

Inherently, humans ask questions or utter statements in different semantic variances notwithstanding the intent of the question or statement in selected cases are similar. An intent in a conversational model is a concept that represents a set of semantically similar sentences for which the same response is suitable in a dialog. For example, utterances like "good morning", "hello", and "hi" are all used for the intent of a greeting. Discernment of intents may become more difficult, however, depending on the complexity of the utterance used. In a more complex example, one client may pose the question "How can I reset my internet account", while another may state "I need to reset my internet password". These questions/statements, each of which the intent would be fairly easily understood to be more or less equivalent by a human operator, may trigger a variety of responses from virtual agents. In one scenario, the virtual agent may interpret the "resetting the internet account" question as a query regarding the resetting of the client's internet service in general (e.g., resetting a modem or router associated with their account), where the client's actual intent was the same as the other client requesting a password reset to get into their internet (billing/email) account. A vast variety of examples exist like these in which virtual agents must be trained with attendant nuances to offer accurate results to the client when provided with utterances of such variety.

Modern chat systems recognize this limitation and attempt to create intent models by recognizing statistical classifiers trained with sample utterances. Users/administrators (i.e., clients, customers, or otherwise human operators) often create intents by collecting and annotating many sentences with their respective intents, which is a labor-intensive process. In some cases, users may cycle through hundreds if not thousands of sample utterances while still not achieving a very high intent success rate when populated into live dialog. However, the high cost involved often means that the user can afford to annotate only small example sets of utterances, resulting in further sub-optimal intent recognition performance in live dialog situations. Notwithstanding and although labor-intensive, these systems tend to benefit from receiving training on more data than less, and so such systems tend to be built iteratively.

In some implementations, various tools may be provided to users to ease the amount of labor necessitated in this intent authoring process. For example, users who need to author (define) intents for a conversation service can use tools to bootstrap an intent definition. One such tool leverages existing human-to-human chat logs and enables the client to find utterance examples from the logs that are relevant to the intent. In the process, once the client starts with one or more example utterances believed to be relevant to the intent, the tool can match the examples with utterances in the chat logs and produce recommendations. The tool provides the user a way to select examples from the pool of recommendations to add to the intent, and this process can repeat iteratively as the user adds examples from the recommendations such that the matching restarts from the accumulated set.

While building an intent iteratively, the intent builder, hereby referred to as builder, will add anywhere from one utterance to a small batch of utterances to a given intent at a time and continuously do so over time. Usually, as aforementioned, these examples are sourced from many different corpora of unlabeled data. Often these data sources: lack any organization with respect to the intent being built; contain many examples that are unrelated to the intent altogether; and don't reflect qualities of the utterances already selected to be in the intent. Additionally, these data sources usually are simple functions of time and the builder's decisions, generally taking into account the choices made in order to remove those examples from consideration in the data source as they are already in the intent.

Accordingly, the mechanisms disclosed herein consider a system to build intents iteratively while taking into account the aforementioned considerations. The system utilizes two different methods (i.e., using two different computational models) that receive a batch of utterances as input and return a related batch of utterances as output, also known as recommendations. The time over which these jobs run is variable. As the builder moves through sets of recommendations, jobs according to both methods are scheduled dynamically depending on a number of statistics derived from how any utterances and sets of recommendations the builder has seen and acted on. Results from jobs are collected as their job completes and are seamlessly integrated into the next and all future sets of recommendations. Later iterations of a job use the output data of all previous iterations of all jobs run, as well as any decisions the builder has made on the results of each job, as input in order to maximize relevance of the recommendations.

Job scheduling is an expansive and well-understood field in abstract. There are many tools and services that allow people to build queues and pull information from the queue for processing while tracking status along the way. In the field of machine learning, job schedulers are used to queue up segments of a long running job, or alternatively to queue individual jobs as users submit them. Generally some compute node or cluster will then pull jobs from the queue and process those jobs, storing results as they become available. Alternatively, time-consuming jobs are run offline or have partial results precomputed to speed up the job run time in a live setting.

However, when recommendations are sourced for an intent builder, they must either be precomputed from some set or quickly found. Iterative models of building intents might opt for one method or another, rather than both, with the ability to adjust the tradeoff between the two. The limitations of existing systems are in the inability to define such a tradeoff in easy-to-understand terms for an intent builder. The mechanisms described herein therefore provide an intuitive way for a builder to track the amount of work they've accomplished, while scheduling longer-running jobs (according to one of the methods) utilizing a job queue trigger which is contextually-dependent rather than independent of the amount of data sourced into the intent. Additionally, a method of seamless integration between results from short-running and long-running jobs is provided so as to always allow the intent builder to have examples to score (as opposed to waiting for a new model to train after every few sets of decisions). This functionality contrasts with existing intent building services where a user is required to train full models after every set of changes they make, requiring time between any sets of recommendations they can see that have reflected their latest changes. The present invention, conversely, allows for continuous changes to be reflected in the short and long term, as will be discussed.

It is understood in advance that although this disclosure includes a detailed description on cloud computing, implementation of the teachings recited herein are not limited to a cloud computing environment and/or computing systems associated with one or more vehicles. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
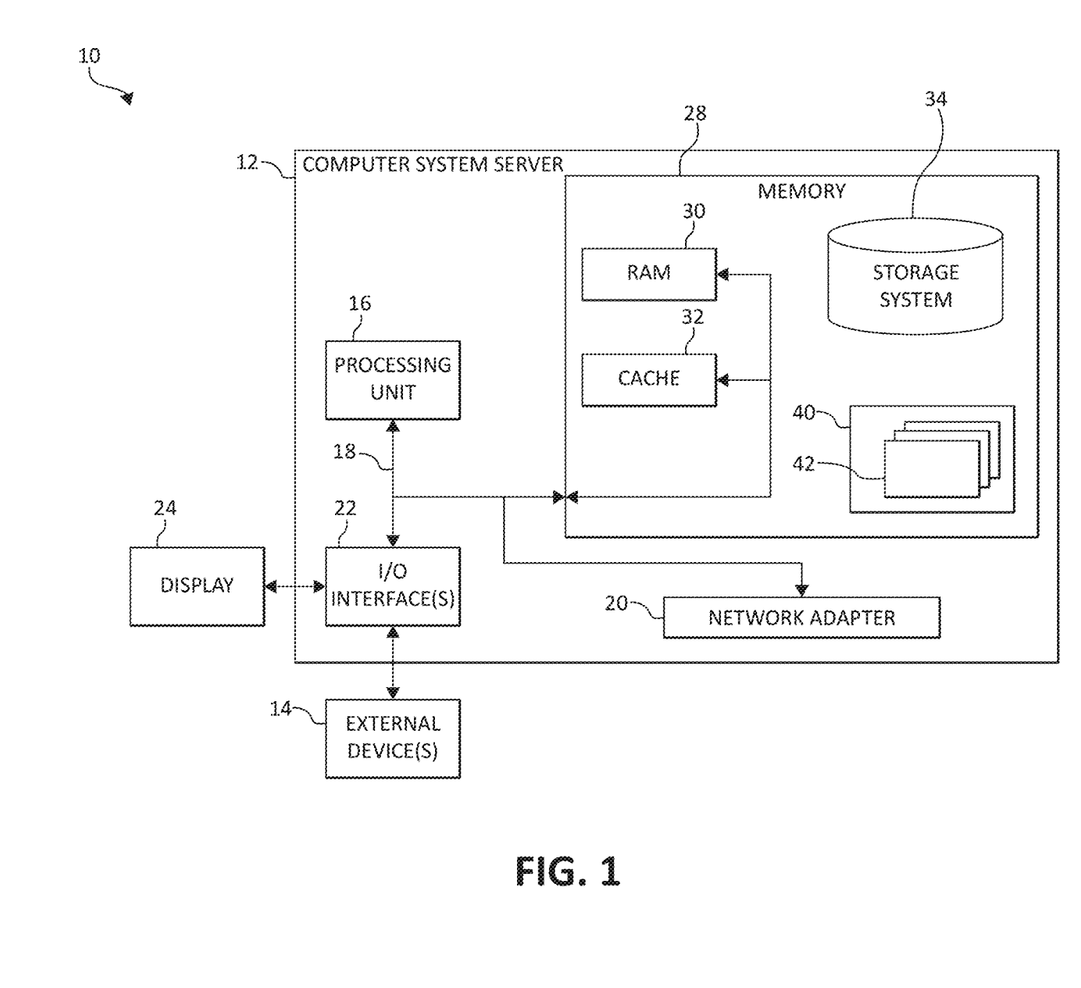
FIG. 1 is a block diagram depicting an exemplary computing node, according to embodiments of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 (or memory subsystem 28) can include computer system readable media in the form of volatile memory, such as random access memory (RAM) 30 and/or cache memory 32. Cache memory 32 may comprise, for example, a shared cache (such as an L2 cache) which is shared among multiple cores of the processor 16 and/or may comprise a private cache (such as an L1 cache). Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
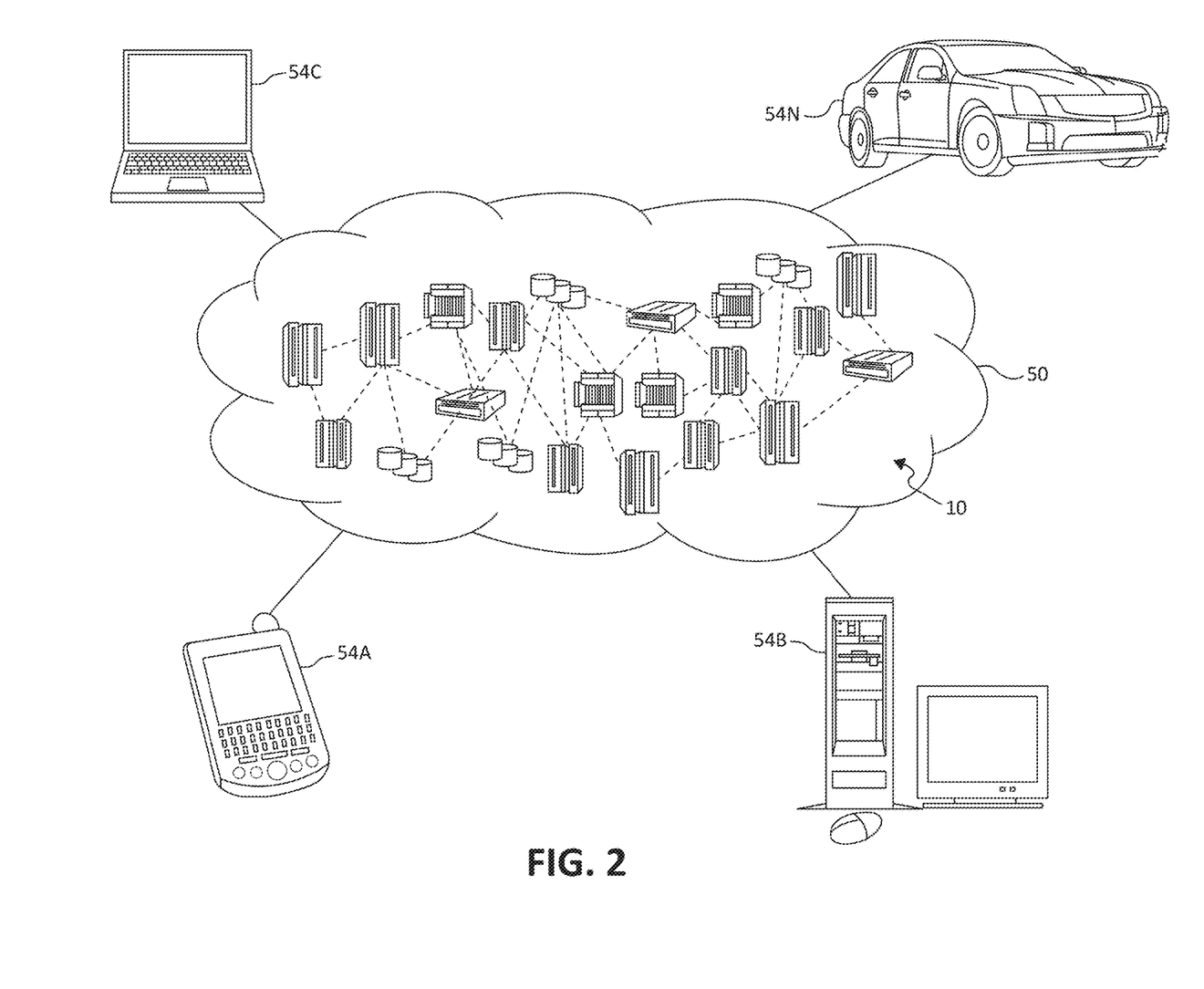
FIG. 2 is an additional block diagram depicting an exemplary cloud computing environment, according to embodiments of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
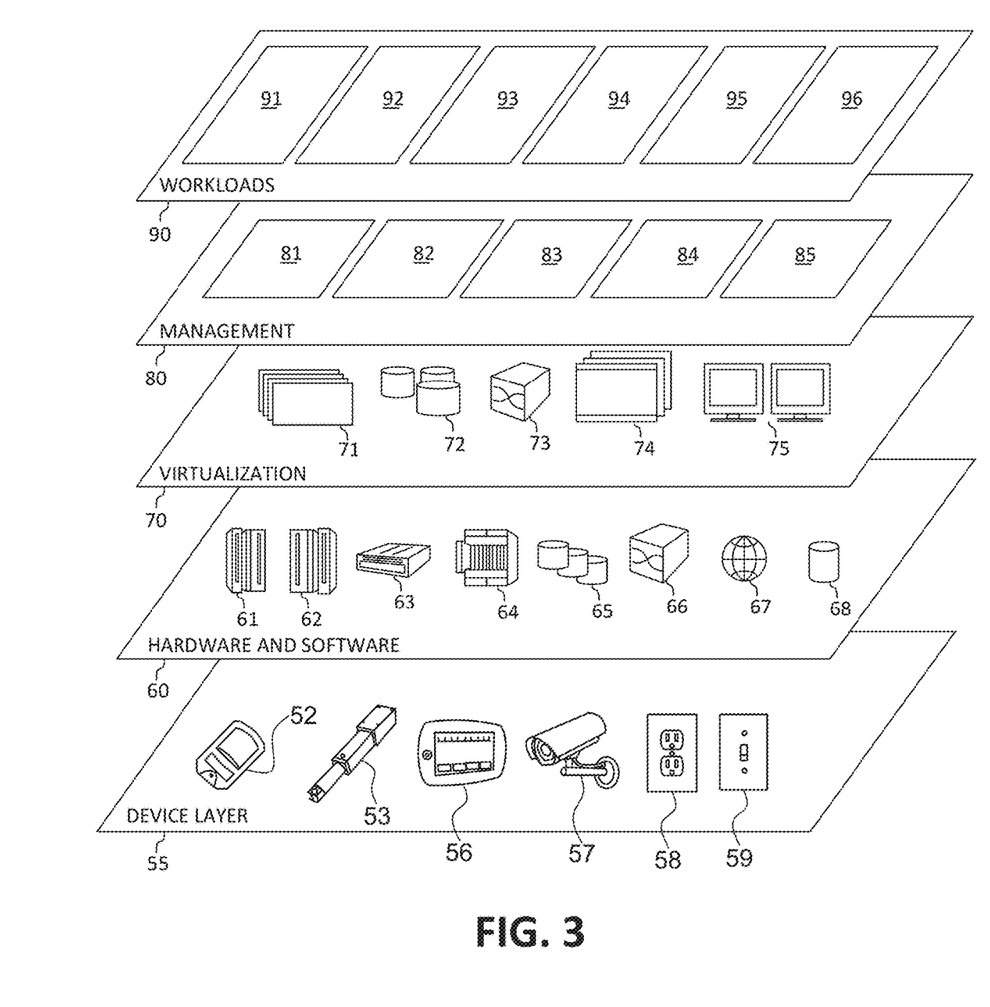
FIG. 3 is an additional block diagram depicting abstraction model layers, according to embodiments of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various conversational and dialog analyzing functions 96. One of ordinary skill in the art will appreciate that the conversational and dialog analyzing functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
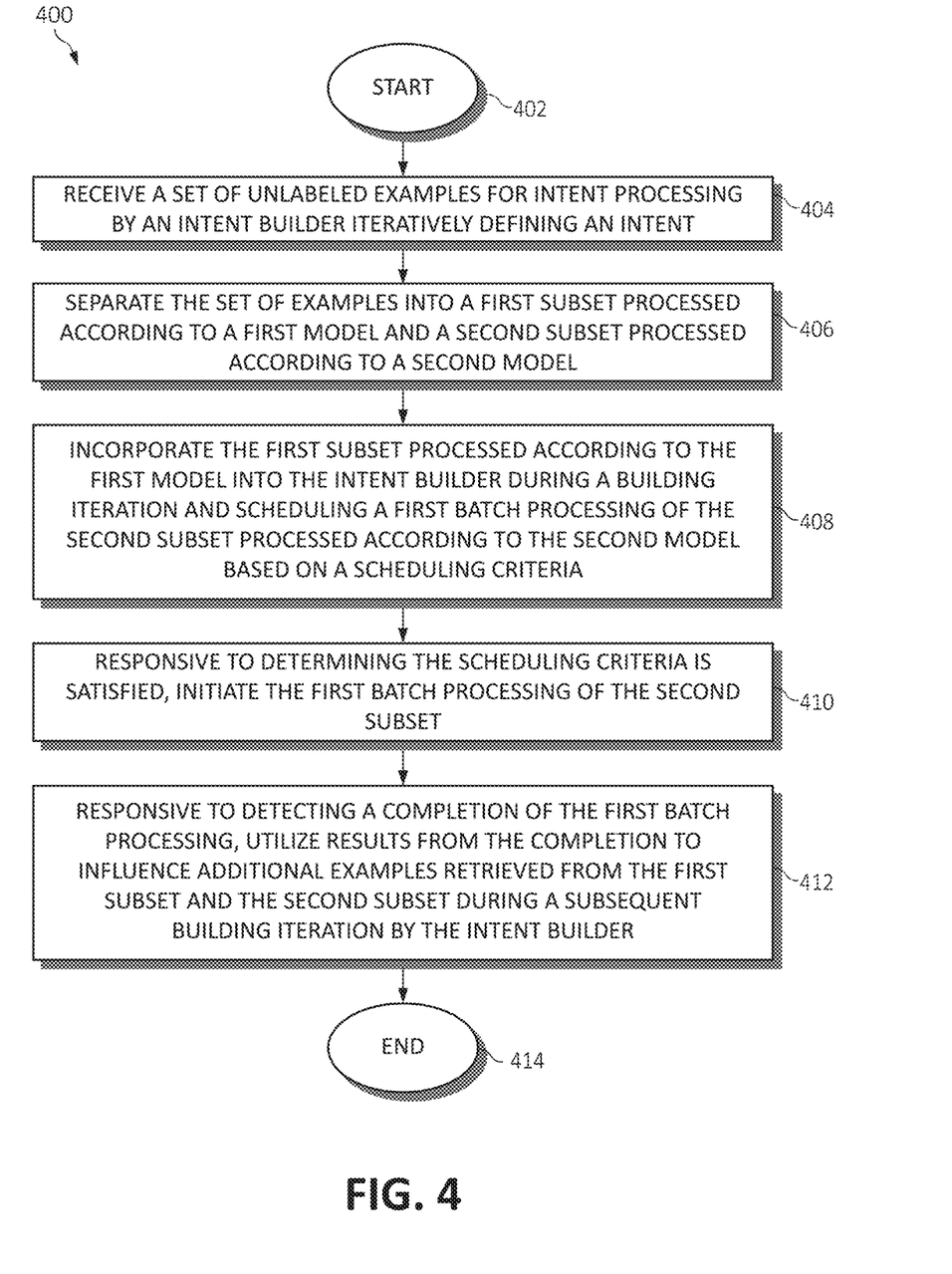
FIG. 4 is a flow chart diagram depicting a method for expansion of intent classification data utilizing batch utterance scheduling, according to embodiments of the present invention.

Turning now to FIG. 4, a method 400 for expansion of intent classification data utilizing batch utterance scheduling by a processor is depicted, in which various aspects of the illustrated embodiments may be implemented. The functionality of the method 400 may be executed as instructions on a machine, where the instructions are embodied on a tangible, non-transitory machine-readable storage medium. The method 400 begins at step 402. In some embodiments, a set of unlabeled examples for intent processing is received by an intent builder iteratively defining an intent (step 404). The set of examples are separated into a first subset processed according to a first model and a second subset processed according to a second model (step 406). The first subset is incorporated into the intent builder during a building iteration and scheduling a first batch processing of the second subset processed according to the second model based on a scheduling criteria (step 408). The first batch processing of the second subset processed under the first batch processing is initiated once the scheduling criteria is satisfied (step 410). Upon completion of the first batch processing, results of the completion are used to influence additional examples retrieved from the first subset and the second subset during a subsequent building iteration by the intent builder (step 412). The method 400 ends (step 414).

In accordance with aspects of the present invention, several functional components are considered to have previously been implemented. A first component includes a user interface for a user (builder) to ingest an existing conversation corpus (i.e., received from a data repository of previously saved conversational logs), by file upload or online data transfer from, for example, a human-operated chat platform. A second component includes a search service for the user to query for utterances in the corpus that are relevant to a given intent. A third component includes a labeling tool (i.e., implemented via a user interface (UI)) for the user to indicate whether each of a selected set of retrieved utterances is in the intent or not. A fourth component finally includes a recommendation and expansion mechanism whereby, according to the selections of the user to the set of retrieved utterances, additional utterances which the system predicts are related to the intent are presented for the user to review and confirm. This propagation technique takes user-labeled examples of a small subset of utterances and determines the best way to extend those labels to neighboring examples predicted to be related to the respective intent being authored.

Figure 5:
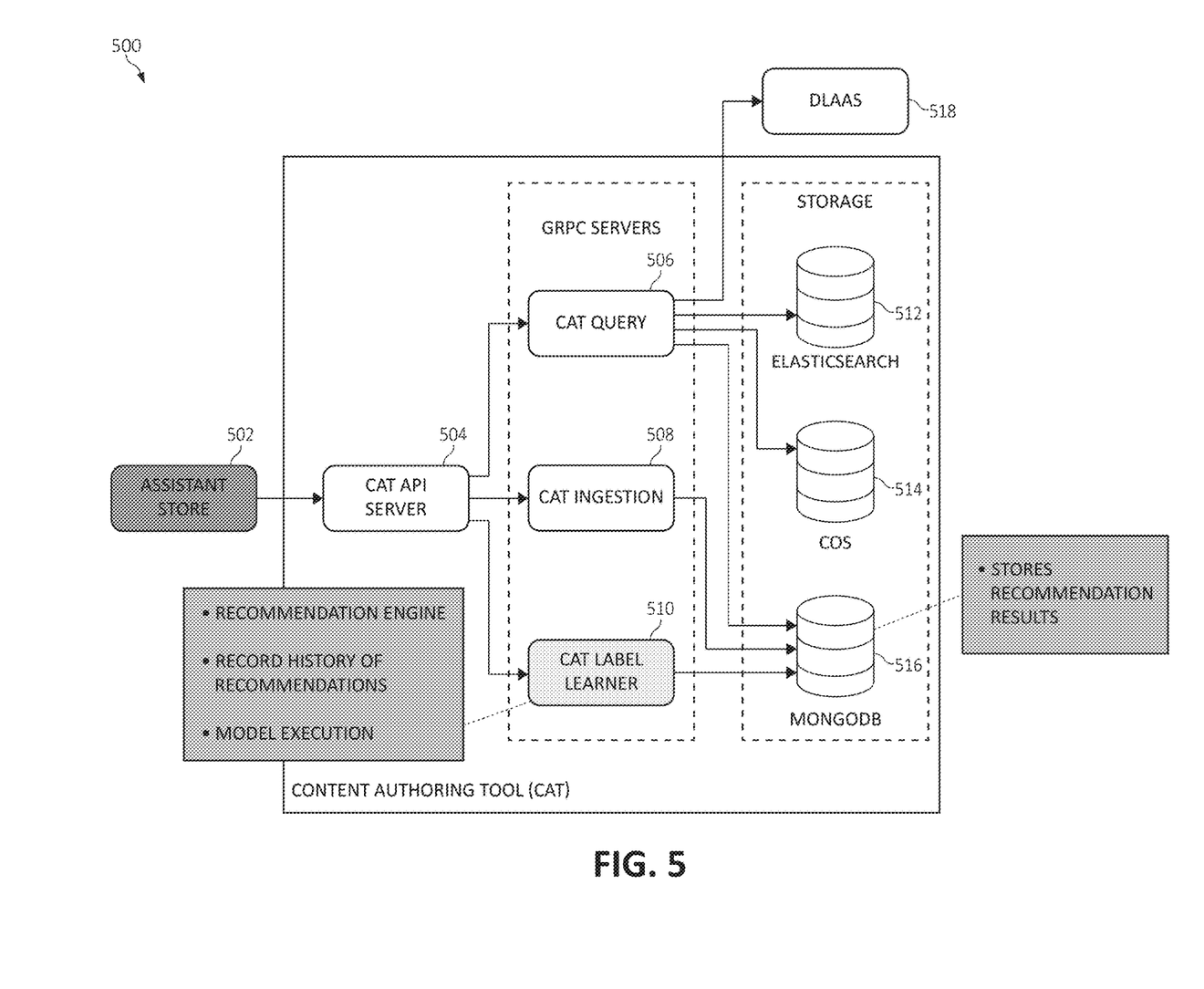
FIG. 5 is a block diagram depicting a system overview of a content authoring tool, according to embodiments of the present invention.

Referring now to FIG. 5 a system overview of a content authoring tool 500 is depicted. As shown, the various functions, or "modules" of functionality, hardware devices, and/or other components in the same descriptive sense as has been previously described in FIGS. 1-3 may be included in FIG. 5. For example, processing unit 16 and memory 28 of FIG. 1 may be employed in FIG. 5 to perform various computational, data processing, storage and other functionality in accordance with various aspects of the present invention.

In an exemplary embodiment, the content authoring tool 500 is implemented within the context of the IBM® Watson® platform and includes an assistant store 502 for receiving user tooling and application programming interface (API) requests into an API/UI application server 504 (which may execute a WebSphere™ Liberty for Java™ profile). The application server 504 may communicate and exchange data regarding the conversational logs with a data ingestion server 506 for receiving and loading the corpus from the repository 504. The user may issue a query to a query server 508 (through an API executing on the application server 504) to return utterances to the user interface having a specific (queried) intent, and the query server 508 may communicate with the data ingestion server 506 using an Elasticsearch search engine 512 to perform the query on an object storage 514 and/or a database 516 (which may comprise a MongoDB™) associated with the stored conversational logs to return the utterances. Upon returning a subset of the conversational logs and labeling a selected set of the utterances therein functioning within the context of the labeling learning server 510, the labeling learning server 510 may pass propagated labels and machine learning model data to the query server 508 and/or the data ingestion server 506 for further analyzation on the remaining corpus. Additionally illustrated in the content authoring tool 500 are administrative services including Watson services 518 (which may be associated with Deep Learning as a Service (Dlaas)) which communicates with the one or more of the servers (e.g., the ingestion server 506).

The content authoring tool 500 may use a semi-supervised learning process that combines automated learning and manual labeling. As previously mentioned, once one or more utterances are given as examples for an intent, a learning algorithm is trained with those examples to look for additional, similar examples in the chat log. The resultant new examples are then sent to the user (i.e., a human expert) for confirmation. The examples confirmed by the user are then added to the initial collection to retrain the learning algorithm, and the process repeats.

When employing a tool such as the content authoring tool 500, more robust and detailed batch utterance expansion methods tend to require more time and data to run (as they are more computationally-intensive), often training large models with many parameters (e.g., using deep neural networks or joint probability distributions) and utilizing complex encodings of data (e.g., semantic vector embeddings of words and sentences). The method employing these detailed batch utterance expansion models is referred to herein as the 'computationally-intensive method'. On the other hand, count and statistical methods tend to be quicker, less computationally-intensive and can be more efficient when referring to smaller amounts of data by training simpler models (e.g., using vector cosine distance or search engine data indexing) with count-based data representations (e.g., lexical/TF-IDF representations of sentences). The method employing these count and statistical models is referred to herein as the 'quickly processed method', because the processing thereof is much faster (i.e., real-time) to the computationally-intensive method, comparatively.

The present invention therefore efficiently implements both methods: one time consuming and data intensive yet producing better recommendations (i.e., the computationally-intensive method); the other providing immediate recommendations albeit allowing for less relevance/more noise within the resultant example set (i.e., the quickly processed method). While the builder iterates through sets of example recommendations, the quickly processed method (utilizing the less computationally-intensive model) is used to immediately retrieve a set of recommendations that take into account the most up to date decisions the builder has made. This new example set is then able to be incorporated directly into the next set of recommendations the builder is shown.

Simultaneously, the system evaluates a number of statistics based on the builder's recent actions and decisions on recommendation sets in order to determine whether (and when) to launch a job that runs the longer computationally-intensive model asynchronously, on a computational cluster. This job can take a variable amount of time based on the amount of data used as input (i.e., based all of the past builder's decisions). Therefore, the system schedules the jobs in a non-overlapping fashion (i.e., executing a single computationally-intensive job at a time) and only triggers the new job to be started or queued when a sufficient number of new utterances and recommendation sets of examples are looked over and acted on by the builder since the last job completed successfully. The scheduling criteria which defines the sufficiency will be further discussed.

When this longer job completes executing on the cluster, the results therefrom are incorporated into the next iterate of recommendations that the builder sees presented in the UI. In this way, the aforementioned optimality tradeoff is balanced within the constraints of time and relevance. In other words, the builder will always have recommended examples to score (as recommendations may be retrieved according to the quickly processed method/model in real-time), while simultaneously providing the builder with the best/most relevant recommendations according to resultant examples output from the computationally-intensive method/model. Furthermore, because the two methods provide feedback to one another according to recent decisions taken by the builder on current recommendations, the next iterate of recommended examples is inherently more efficiently related to the given intent being defined.

Therefore, at any given iteration (greater than the minimum number of iterations to meet the scheduling criteria and the amount of time taken to run the computationally-intensive method job once) during the building of an intent, the builder will be presented a set composed of both: recommendations that are immediate and incorporate the most up to date set of decisions the builder has taken up to that point; and recommendations that are better given the set of actions the builder has taken.

This system has many advantages for the intent builder, primarily, the balance between a relevancy of examples presented to them and time waiting for examples to be generated, rather than opting for one or the other. This allows the intent builder to always have a set of recommendations by which they can take decisions on and can safely assume are within a small margin of error (e.g., a contradiction with a past decision the builder has made). Additionally, the job scheduling triggers a new job to start/be queued as a direct function of all of the past builder's actions, thereby preventing unnecessary computation and only launching the computationally-intensive job when there is enough new data for the model to properly learn from. Furthermore, by definition of the scheduling criteria, it can easily be adapted by the builder to adjust the tradeoff between the aforementioned time and relevance to their liking. This is possible because of the parameters of the job trigger are chosen such that they are easily understood and contextualized by the intent builder.

Figure 6:
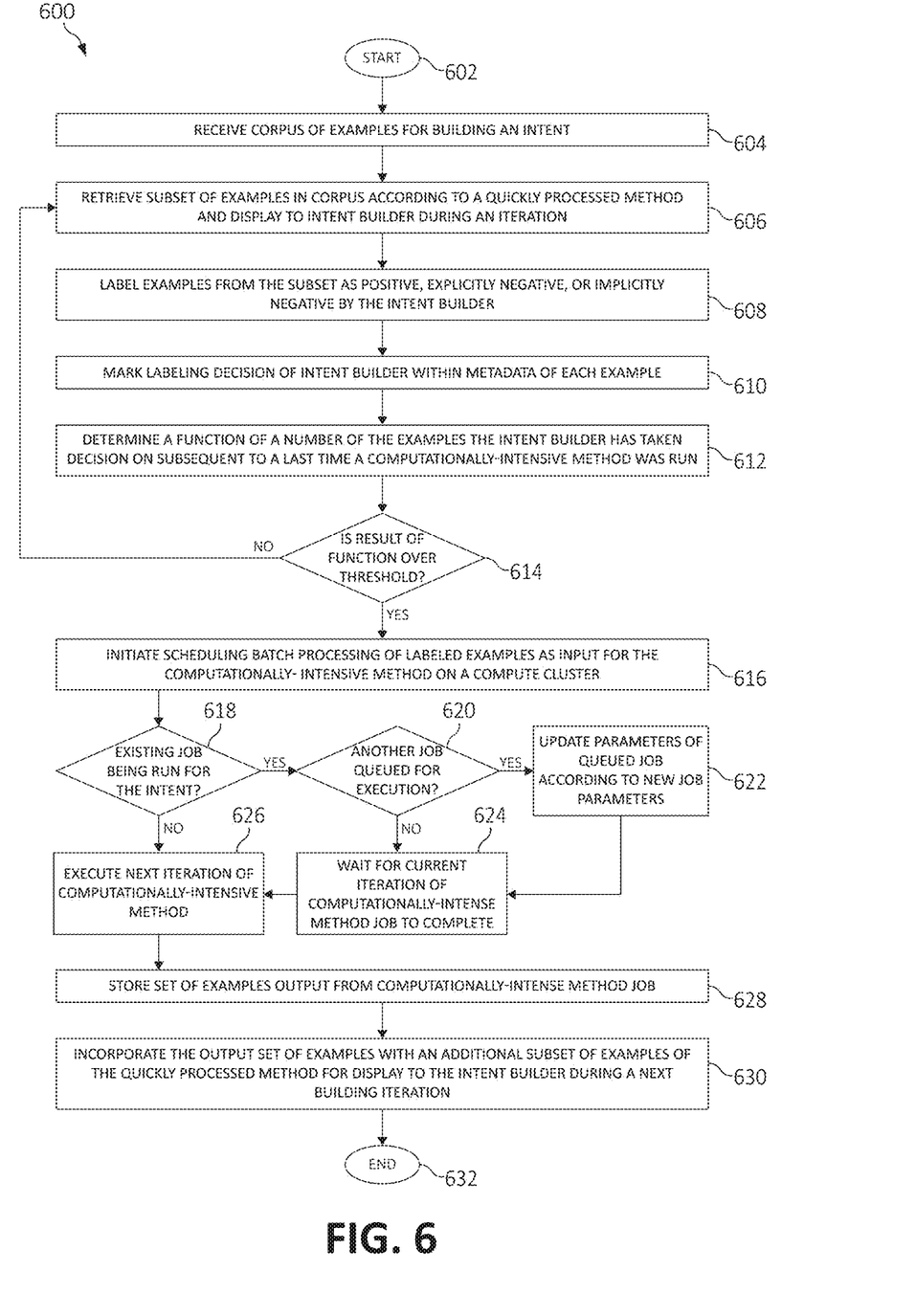
FIG. 6 is a flow chart diagram depicting an iterative batch scheduling process, according to embodiments of the present invention.

Referring now to FIG. 6, a method 600 for an iterative batch scheduling process by a processor is depicted, in which various aspects of the illustrated embodiments may be implemented. The functionality of the method 600 may be executed as instructions on a machine, where the instructions are embodied on a tangible, non-transitory machine-readable storage medium. The method 600 begins at step 602. Initially, it is assumed there exists an intent classifier, A, trained on intent sets $\{I\_1, I\_2, \ldots\}$ where each intent set $I\_j$ contains some set of examples $\{E\_j1, E\_j2, \ldots\}$. The classifier is utilized within a conversational system in which there are stored unlabeled examples received from a corpus (e.g., a chatlog history, hereafter referred to as C) which are used in the construction of the input for the batch utterance expansion methods (step 604).

What is presented to the builder for selection to add to the intent (herein referred to as a 'builder decision') is a very small and organized set of recommendations (utterance examples that are relevant to the specific intent being built currently) that are a subset of C. Thus, the subset of C is retrieved from the corpus according to the quickly processed method, in substantially real-time, for an iteration of the builder to take decisions upon (i.e., decide whether each recommended example is relevant or non-relevant to the particular intent being defined) (step 606). Each builder decision is stored and logged into a database that is accessible via an API.

The builder looks through each example of the retrieved subset of C, and labels those examples as follows. Let a set of recommended utterances at a given iteration, t, from a given method, m, be $\{R\_m1t, R\_m2t, \ldots\}$. A positive example is defined as one that has been chosen via a builder decision to be added to the intent. An explicitly negative example is defined as one that has been chosen via a builder decision to be not added or relevant to the intent. In a given set of examples, if the builder takes a decision on any example yet does not label all examples, then those additional examples from the same set that the builder did not select but did view (i.e., as indicated by metadata) are considered implicitly negative. When the builder decides as to an explicitly positive recommendation, an explicitly negative, or an implicitly negative recommendation, the corresponding example is marked as such in any set of recommendations (at any time t) (step 610). All such positive/negative recommendations at any iteration are not shown again to the builder in future sets of recommendations and are used as input to both the quickly processed method and the computationally-intensive method.

As mentioned, each R_mkt contains metadata indicating whether the builder selected the example to be added to the intent or not, and whether the builder has seen and moved past other examples within the set of recommendations (this is possible because the builder is paging through the set of recommendations 10 at a time). These decisions are indicated in the metadata attached to each example-set (step 612).

For each builder decision, at iteration t−1, the system runs the quickly processed method synchronously, which takes as input all explicitly positive examples and those that are already labelled as being included in the intent in question as input, and returns a set of recommendations R_1jt={R_11t, R_12t, R_13t, . . . } immediately. Next, let P be the number of explicitly positive examples selected, N be the number of implicitly negative examples, and S be the number of examples sets the builder has taken decision on since the last time the computationally-intensive method finished running successfully. A function F(P, N, S) is evaluated to determine whether the scheduling criteria for initiating a new job of the computationally-intensive method is satisfied (step 612). If, at step 612, the result of the determination is over a predetermined threshold (i.e., the scheduling criteria is satisfied according to the function), a job is submitted to a compute cluster to run the computationally-intensive method with the input being all previous iterations of explicit positive and implicit negative builder decisions (step 616). If, at step 612, the result of the determination is not over a predetermined threshold (i.e., the scheduling criteria is not satisfied according to the function), the method 600 returns to step 606 to retrieve and label additional examples utilizing the quickly processed method.

At the time of job submission, a computational node on a compute cluster is reserved for asynchronous processing of the computationally-intensive method (as the time is variable and could be on the order of seconds or minutes or longer). When this new job is submitted, the computational node first determines, at step 618, if there is a currently executing job for the given intent. If, at step 618, no currently executing job exists (for the given intent), the computationally-intensive job is commenced (step 626). If however, at step 618, there is already an existing job executing for the given intent, a next determination is made at step 620 as to whether another job is presently queued up. If, at step 620, another job is not presently queued up for the given intent, the new job is queued as the existing job executing for the given intent is waited for completion (step 624), and the next iteration of the computationally-intensive job is executed subsequent to a completion thereof (step 626). Returning to step 620, if another job is queued for execution, rather than queueing a new job, the existing queued job parameters are updated for processing from the newly formed job reflecting the most recent decisions of the builder. In other words, completion or output results of the currently executing job and/or current decisions taken by the builder while the job is in queue may influence input parameters of the queued job. Subsequently, again, the new job is queued as the existing job executing for the given intent is waited for completion (step 624), and the next iteration of the computationally-intensive job is executed subsequent to a completion thereof (step 626).

It should be noted that at any given point in time there should be at most one computationally-intensive job executing and one job queued. There is no need to queue more than one job, as older jobs in the queue become progressively more outdated (e.g., their parameters reflect builder decisions further back in time instead of the builder's most recent decisions). When each job iteration finishes, a set of recommended examples R_2jt={R_21t, R_22t, R_23t, . . . } output from the resultant completion of the job is stored (step 628). These resultant output examples may be incorporated with additional examples retrieved from the quickly processed method during a next building iteration undertaken by the builder (step 630). The iteration t here, and the parameters of the job, are such that they are at most S iterations outdated. In the worst case, the set R_2jt reflects builder decisions from the sets R_1j{t−S} and R_2j{t−S}, while in the best case the set may reflect decisions from the sets R_1j{t−1} and R_2j{t−1}. When a set of recommended examples R_2jt is generated, this set is used in each iteration t=t through t=(t+S) or until another set R_2j* is generated. At any given iteration t, when the builder is shown the examples they are sourced from both R_1jt and R_2jt and builder decisions are recorded across both. The method 600 ends (step 632).

Again it should be noted that the function F(P, N, S) is used to determine the scheduling criteria for a computationally-intensive job being submitted. The system currently defines this simply as the Boolean expression F(P, N, S)=(P>2&&N>2)&&(S>2). This ensures that the input to both the quickly processed method and the computationally-intensive method are at least small batches and that the computationally-intensive method recommendation example sets are generated from data and builder decisions that are no more than three iterations outdated. However, P, N, and S are easily understood variables for the intent builder and naturally contextualized in the work they are performing. Thus, it is simple for the intent builder to adjust F according to their workflow/personal preferences, allowing customization of the tradeoff between the aforementioned time and relevance in generating recommended examples.

It should further be noted that, as it pertains to the present invention, any machine learning/deep learning model and/or algorithm may be employed in context with the functionality described herein. In one aspect, the machine learning based models may be performed using a wide variety of methods or combinations of methods, such as supervised learning, unsupervised learning, reinforcement learning and so forth. Some non-limiting examples of supervised learning which may be used with the present technology include AODE (averaged one-dependence estimators), artificial neural network, backpropagation, Bayesian statistics, naive bays classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, and fuzzy clustering. Specific details regarding any of the examples of supervised, unsupervised, reinforcement learning, or other machine learning described in this paragraph are known and are considered to be within the scope of this disclosure.

The present invention may be an apparatus, a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for expansion of intent classification data utilizing batch utterance scheduling, by a processor, comprising:

receiving a set of unlabeled examples for intent processing by an intent builder iteratively defining an intent;

executing machine learning logic to separate the set of examples into a first subset processed according to a first model and a second subset processed according to a second model;

incorporating the first subset processed according to the first model into the intent builder during a building iteration and scheduling a first batch processing of the second subset processed according to the second model based on a scheduling criteria, wherein decisions taken by the intent builder on examples from the first subset are used as input during the first batch processing of the second subset;

responsive to determining the scheduling criteria is satisfied, initiating the first batch processing of the second subset; and executing the machine learning logic to, responsive to detecting a completion of the first batch processing, utilize results from the completion to influence additional examples retrieved from the first subset and the second subset during a subsequent building iteration by the intent builder, wherein decisions taken by the intent builder on examples from the second subset, subsequent to the first batch processing, are used as input for retrieving the additional examples from the first subset.

2. The method of claim 1, wherein utilizing the decisions includes determining metadata attached to each example from both the first and second subset viewed by the intent builder indicates a selected positive or negative recommendation.

3. The method of claim 1, further comprising:
staging additional batch processing of the second subset dynamically as processed under a second batch processing; and
initiating the second batch processing after completion of the first batch processing; wherein the second batch processing incorporates the decisions taken by the intent builder on both the first subset and the second subset processed under the first batch processing.

4. The method of claim 1, wherein the scheduling criteria is based on a predicted need for availability of resources and a relevancy of the examples of the first subset.

5. The method of claim 1, wherein the first model is processed utilizing a synchronous real-time method and the second model is processed utilizing an asynchronous computationally-intensive method.

6. The method of claim 1, wherein the set of unlabeled examples comprise utterances retrieved from a corpus of interactive chatlogs between agents and clients for a given product or service.

7. A system for expansion of intent classification data utilizing batch utterance scheduling, comprising:
a processor executing instructions stored in a memory device; wherein the processor:
receives a set of unlabeled examples for intent processing by an intent builder iteratively defining an intent;
executes machine learning logic to separate the set of examples into a first subset processed according to a first model and a second subset processed according to a second model;
incorporates the first subset processed according to the first model into the intent builder during a building iteration and scheduling a first batch processing of the second subset processed according to the second model based on a scheduling criteria, wherein decisions taken by the intent builder on examples from the first subset are used as input during the first batch processing of the second subset;

responsive to determining the scheduling criteria is satisfied, initiates the first batch processing of the second subset; and executing the machine learning logic to, responsive to detecting a completion of the first batch processing, utilize results from the completion to influence additional examples retrieved from the first subset and the second subset during a subsequent building iteration by the intent builder, wherein decisions taken by the intent builder on examples from the second subset, subsequent to the first batch processing, are used as input for retrieving the additional examples from the first subset.

8. The system of claim 7, wherein utilizing the decisions includes determining metadata attached to each example from both the first and second subset viewed by the intent builder indicates a selected positive or negative recommendation.

9. The system of claim 7, wherein the processor:
stages additional batch processing of the second subset dynamically as processed under a second batch processing; and
initiates the second batch processing after completion of the first batch processing; wherein the second batch processing incorporates the decisions taken by the intent builder on both the first subset and the second subset processed under the first batch processing.

10. The system of claim 7, wherein the scheduling criteria is based on a predicted need for availability of resources and a relevancy of the examples of the first subset.

11. The system of claim 7, wherein the first model is processed utilizing a synchronous real-time method and the second model is processed utilizing an asynchronous computationally-intensive method.

12. The system of claim 7, wherein the set of unlabeled examples comprise utterances retrieved from a corpus of interactive chatlogs between agents and clients for a given product or service.

13. A computer program product for expansion of intent classification data utilizing batch utterance scheduling, the computer program product comprising a non-transitory computer-readable storage medium having computer-readable program code portions stored therein, the computer-readable program code portions comprising:
an executable portion that receives a set of unlabeled examples for intent processing by an intent builder iteratively defining an intent;
an executable portion that executes machine learning logic to separate the set of examples into a first subset processed according to a first model and a second subset processed according to a second model;
an executable portion that incorporates the first subset processed according to the first model into the intent builder during a building iteration and scheduling a first batch processing of the second subset processed according to the second model based on a scheduling criteria, wherein decisions taken by the intent builder on examples from the first subset are used as input during the first batch processing of the second subset;
an executable portion that, responsive to determining the scheduling criteria is satisfied, initiates the first batch processing of the second subset; and
an executable portion that executes the machine learning logic to, responsive to detecting a completion of the first batch processing, utilize results from the completion to influence additional examples retrieved from the first subset and the second subset during a subsequent building iteration by the intent builder, wherein decisions taken by the intent builder on examples from the second subset, subsequent to the first batch processing, are used as input for retrieving the additional examples from the first subset.

14. The computer program product of claim 13, wherein utilizing the decisions includes determining metadata attached to each example from both the first and second subset viewed by the intent builder indicates a selected positive or negative recommendation.

15. The computer program product of claim 13, further including an executable portion that:

stages additional batch processing of the second subset dynamically as processed under a second batch processing; and initiates the second batch processing after completion of the first batch processing; wherein the second batch processing incorporates the decisions taken by the intent builder on both the first subset and the second subset processed under the first batch processing.

16. The computer program product of claim 13, wherein the scheduling criteria is based on a predicted need for availability of resources and a relevancy of the examples of the first subset.

17. The computer program product of claim 13, wherein the first model is processed utilizing a synchronous real-time method and the second model is processed utilizing an asynchronous computationally-intensive method.

18. The computer program product of claim 13, wherein the set of unlabeled examples comprise utterances retrieved from a corpus of interactive chatlogs between agents and clients for a given product or service.

* * * * *